US010775483B1

(12) United States Patent
Kim et al.

(10) Patent No.: US 10,775,483 B1
(45) Date of Patent: Sep. 15, 2020

(54) APPARATUS FOR DETECTING AND RECOGNIZING SIGNALS AND METHOD THEREOF

(71) Applicant: H LAB CO., LTD., Gyeongju-si, Gyeongsangbuk-do (KR)

(72) Inventors: Hyoung Min Kim, Seoul (KR); Han June Kim, Seoul (KR); Jae Jun Yoon, Gongju-si (KR); Hyo Ryun Lee, Pohang-si (KR); Jong Hee Park, Seongnam-si (KR)

(73) Assignee: H LAB CO., LTD., Gyeongju-si (KR)

( * ) Notice: Subject to any disclaimer, the term of this patent is extended or adjusted under 35 U.S.C. 154(b) by 0 days.

(21) Appl. No.: 16/707,200

(22) Filed: Dec. 9, 2019

(30) Foreign Application Priority Data

Oct. 11, 2019 (KR) .................. 10-2019-0126370

(51) Int. Cl.
*G01S 7/41* (2006.01)
*G01S 13/58* (2006.01)
*G06K 9/00* (2006.01)
*G06T 7/70* (2017.01)

(52) U.S. Cl.
CPC ............ *G01S 7/415* (2013.01); *G01S 13/582* (2013.01); *G01S 13/584* (2013.01); *G01S 13/589* (2013.01); *G06K 9/00335* (2013.01); *G06T 7/70* (2017.01)

(58) Field of Classification Search
CPC ...... G01S 7/415; G01S 13/582; G01S 13/584; G01S 13/589; G06K 9/00335; G06T 7/70
See application file for complete search history.

(56) References Cited

U.S. PATENT DOCUMENTS

| 2011/0181510 | A1* | 7/2011 | Hakala | .................... G06F 3/017 345/158 |
| 2016/0320854 | A1* | 11/2016 | Lien | ......... G01S 7/354 |
| 2020/0064924 | A1* | 2/2020 | Poupyrev | ................ G01S 13/88 |
| 2020/0125180 | A1* | 4/2020 | Malysa | ..................... G06F 3/03 |

FOREIGN PATENT DOCUMENTS

| KR | 10-2016-0128318 A | 11/2016 |
| KR | 10-2017-0007447 A | 1/2017 |
| KR | 10-2017-0012422 A | 2/2017 |
| KR | 10-1744692 B2 | 6/2017 |

(Continued)

OTHER PUBLICATIONS

Communication dated Feb. 19, 2020, issued by the Korean Patent Office in counterpart Korean Patent Application No. 10-2019-0126370.

(Continued)

*Primary Examiner* — Timothy X Pham
(74) *Attorney, Agent, or Firm* — Sughrue Mion, PLLC

(57) ABSTRACT

Disclosed is a radar-based human motion recognition apparatus including a first radar for emitting a first radar signal for detecting a position of an object, a second radar for emitting a second radar signal for gesture recognition, an antenna for receiving a first reflected signal reflected from the object by the first radar signal and a second reflected signal reflected from the object by the second radar signal, and a controller for determining situation information based on second signal processing for the second reflected signal.

15 Claims, 9 Drawing Sheets

(56) References Cited

FOREIGN PATENT DOCUMENTS

KR     10-2018-0049263 A     5/2018
KR     10-2018-0101171 A     9/2018

OTHER PUBLICATIONS

Communication dated Feb. 4, 2020, issued by the Korean Patent Office in counterpart Korean Patent Application No. 10-2019-0126370.
Communication dated Nov. 15, 2019, issued by the Korean Patent Office in counterpart Korean Patent Application No. 10-2019-0126370.
M. G. Amin et al., "Hand Gesture Recognition based on Radar Micro-Doppler Signature Envelopes", published on Feb. 7, 2019.
Cai Wen et al., "Clutter Suppression for Airborne FDA-MIMO Radar Using Multi-Waveform Adaptive Processing and Auxiliary Channel STAP", Signal Processing 154 (2019) 280-293.

* cited by examiner

APPARATUS FOR DETECTING AND RECOGNIZING SIGNALS AND METHOD THEREOF

CROSS-REFERENCE TO RELATED APPLICATION

This application claims priority to Korean Patent Application No. 10-2019-0126370, filed on Oct. 11, 2019 in the Korean Intellectual Property Office, the disclosure of which is incorporated herein by reference.

BACKGROUND OF THE DISCLOSURE

Field of the Disclosure

The present disclosure relates to a method of detecting and recognizing signals and an apparatus therefor.

Description of the Related Art

Recently, there is increasing demand for radar-based human motion recognition, which is a technology that can detect and recognize user's hand gestures in real time in an environment and control a device through the hand gestures. Compared to optical gesture recognition, radar-based human motion recognition is more accurate and advantageous in terms of cost. In addition, when radar-based human motion recognition is used, miniaturization of an apparatus can be implemented. In addition, compared to gesture recognition through images, radar-based human motion recognition has a relatively small amount of data to be processed and is advantageous in terms of privacy.

Recently, a method of detecting hand movements or arm movements through a wearable device equipped with a radar sensor and motion recognition technology using frequency modulated continuous waves (FMCWs) that support a wide bandwidth have been proposed.

However, in the case of gesture recognition using a wearable device equipped with a radar sensor, since a wearable device emits radar signals and reflected signals are received by a fixed device located opposite a user, gesture recognition or available services may be limited.

In a method of using broadband continuous-wave radar signals such as FMCW, gestures are recognized through repetitive learning. However, the method is limited in recognizing hand movements or arm movements.

SUMMARY OF THE DISCLOSURE

Therefore, the present disclosure has been made in view of the above problems, and it is an object of the present disclosure to provide a method of recognizing surrounding situations and various human motions using a multi-radar-based device and an apparatus therefor.

It is another object of the present disclosure to provide a method of recognizing movement directions and gestures using reflected waves generated by interaction between user's motions and radar signals and an apparatus therefor.

It is yet another object of the present disclosure to provide a method of recognizing various human motions by configuring a multi-radar emission frame through adjusting parameters of a plurality of radars or a single radar and providing a multi-radar field through the multi-radar emission frame and an apparatus therefor.

In accordance with one aspect of the present disclosure, provided is a radar-based human motion recognition method including emitting a first radar signal for detecting a position of an object; receiving a reflected signal of the first radar signal generated by the object; detecting a position of the object based on first signal processing for the received reflected signal of the first radar signal and determining whether the position of the object is within a preset gesture recognition area; activating a second radar for emitting a second radar signal for gesture recognition when the position of the object is within the gesture recognition area and transmitting a multi-radar emission frame for emitting the first and second radar signals in a time sharing manner; extracting vector values for a movement direction of the object based on first signal processing for a reflected signal of a first radar signal received after the multi-radar emission frame is transmitted, performing second signal processing for a reflected signal of the second radar signal, and extracting characteristic values for the reflected signal of the second radar signal based on the second signal processing; transmitting the vector values and the characteristic values to a server; and receiving at least one of gesture information determined based on the vector values and the characteristic values, control information corresponding to the gesture information, and information on an external device associated with the gesture information from the server.

The extracting of the characteristic values may include extracting vector values for a movement direction of the object based on first signal processing for a reflected signal of a first radar signal received in an Nth (N being an integer greater than 0) period of the multi-radar emission frame and a reflected signal of a first radar signal received in an (N+k)th (k being an integer greater than 0) period of the multi-radar emission frame; and performing second signal processing for a reflected signal of a second radar signal received from an Nth period to an (N+k)th period of the multi-radar emission frame, and extracting characteristic values for the reflected signal of the second radar signal based on the second signal processing.

In the determining of whether the position of the object is within the preset gesture recognition area, the first signal processing for the received first reflected signal may include range-processing to extract distance information through a window function and fast Fourier transform, echo suppression processing to suppress a signal magnitude of clutter having a relatively high reflectance, and Doppler processing to extract point information for position detection, and in the first signal processing performed in the extracting of the vector values, the echo suppression processing may be not performed, and the Doppler processing may be performed.

The second signal processing may include digital beam-forming processing for three-dimensional spectrum generation.

The characteristic values may include pattern information of minute Doppler signals or pattern information of result values obtained by performing digital signal processing on the second reflected signal at least once.

The radar-based human motion recognition method according to one embodiment may further include determining local gesture information based on the vector values and the characteristic values and comparing the local gesture information with the gesture information received from the server; and transmitting the local gesture information to an application or a driving system when the local gesture information matches the gesture information received from the server.

In the transmitting of the vector values and the characteristic values, current position information may be confirmed and the current position information, the vector values, and the characteristic values may be transmitted to the server.

In accordance with another aspect of the present disclosure, provided is a radar-based human motion recognition method including emitting a first radar signal for detecting a position of an object; receiving a reflected signal of the first radar signal generated by the object; detecting a position of the object based on first signal processing for the received reflected signal of the first radar signal and determining whether the position of the object is within a preset gesture recognition area; determining a current operation mode when the position of the object is within the gesture recognition area, and emitting a second radar signal for gesture recognition when the current operation mode is a gesture recognition mode; receiving a reflected signal of the second radar signal generated by the object; determining situation information based on second signal processing for the reflected signal of the second radar signal; and transmitting the situation information to an application or a driving system.

The first radar signal may be a pulse radar signal using a pulse signal, and the second radar signal may be a continuous wave radar signal continuously output with respect to time.

The emitting of the second radar signal may include transmitting a multi-radar emission frame for emitting the first and second radar signals in a time sharing manner.

In accordance with still another aspect of the present disclosure, provided is a radar-based human motion recognition apparatus including a first radar for emitting a first radar signal for detecting a position of an object; a second radar for emitting a second radar signal for gesture recognition; an antenna for receiving a first reflected signal reflected from the object by the first radar signal and a second reflected signal reflected from the object by the second radar signal; a controller including at least one processor configured to detect a position of the object based on first signal processing for the first reflected signal, determine whether the position of the object is within a preset gesture recognition area, activate a second radar for emitting a second radar signal for gesture recognition when the position of the object is within the gesture recognition area, generate a multi-radar emission frame for emitting the first and second radar signals in a time sharing manner, extract vector values for a movement direction of the object based on first signal processing for a reflected signal of a first radar signal received after the multi-radar emission frame is transmitted, perform second signal processing for a reflected signal of the second radar signal, and extract characteristic values for the reflected signal of the second radar signal based on the second signal processing; and a communicator for transmitting the vector values and the characteristic values to a server and receiving at least one of gesture information determined based on the vector values and the characteristic values, control information corresponding to the gesture information, and information on an external device associated with the gesture information from the server.

In accordance with still another aspect of the present disclosure, provided is a radar-based human motion recognition apparatus including a first radar for emitting a first radar signal for detecting a position of an object; a second radar for emitting a second radar signal for gesture recognition; an antenna for receiving a first reflected signal reflected from the object by the first radar signal and a second reflected signal reflected from the object by the second radar signal; and a controller including at least one processor configured to detect a position of the object based on first signal processing for the first reflected signal, determine whether the position of the object is within a preset gesture recognition area, determine a current operation mode when the position of the object is within the gesture recognition area, emit a second radar signal for gesture recognition when the current operation mode is a gesture recognition mode, determine situation information based on second signal processing for the second reflected signal, and transmit the situation information to an application or a driving system.

When the position of the object is within the gesture recognition area, the controller may control the first and second radars to output a multi-radar emission frame for emitting the first and second radar signals in a time sharing manner.

In accordance with yet another aspect of the present disclosure, provided is a radar-based human motion recognition apparatus including a radar for emitting radar signals; an antenna for receiving reflected signals reflected from an object; and a controller including at least one processor configured to set parameters for the radar so that the radar emits a first radar signal for detecting a position of an object in a first time interval, detect a position of the object based on first signal processing for a reflected signal of the first radar signal, determine whether the position of the object is within a preset gesture recognition area, adjust parameters for the radar so that the radar emits a second radar signal for gesture recognition in a second time interval when the position of the object is within the gesture recognition area, determine situation information based on second signal processing for a reflected signal of the second radar signal, and transmit the situation information to an application or a driving system.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
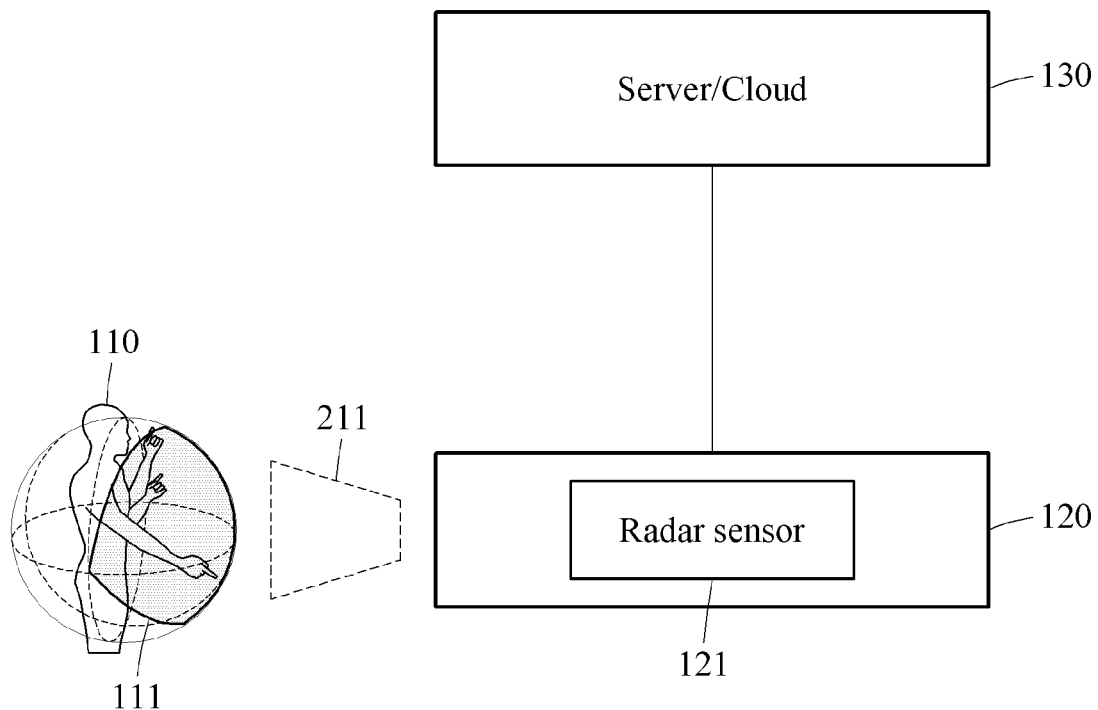
FIG. 1 illustrates a radar-based human motion recognition service system according to one embodiment of the present disclosure.

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

In addition, terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

FIG. 1 illustrates a radar-based human motion recognition service system according to one embodiment of the present disclosure.

Referring to FIG. 1, a radar-based human motion recognition service system includes a device 120 for providing a gesture recognition service and a server/cloud 130.

In this specification, human motion recognition includes gesture recognition and refers to recognizing various human movements, movement directions, and movement speeds. However, for convenience of description, gesture recognition may have the same meaning as human motion recognition.

The device 120 for providing a gesture recognition service may recognize the gesture of a user 110 in a gesture recognition area 211 of a radar sensor 121.

In this case, the gesture recognition area 211 may be an area for detecting hand movements or arm movements of the user 110. That is, from the user's point of view, the gesture recognition area 211 may be recognized as a space 111 in which the user 110 moves their hands or arms.

The gesture recognition area 211 may be larger or smaller than the space 111 in which the user 110 moves their hands or arms. However, in this specification, for convenience of description, the gesture recognition area 211 and the space 111 in which the user 110 moves their hands or arms are regarded as the same concept.

The server/cloud 130 may be a cloud system connected to the device 120 via a network, or a server system for providing services.

The device 120 may transmit all data collected for gesture recognition to the server/cloud 130.

The server/cloud 130 may improve gesture recognition performance through machine learning based on data collected from the device 120.

Learning processes for gesture recognition may include a process of transmitting radar sensor setup information for optimizing a radar sensor to the device 120 and receiving a setup completion signal from the device 120, a process of receiving data for learning from the device 120, and a process of determining the parameters of a learning model.

In this case, optimization of a radar sensor may include adjusting data slice, adjusting the frame sequence of a chip signal, and adjusting a sampling rate for analog-to-digital conversion.

The process of determining the parameters of a learning model may include adjusting sampling data quantity and sampling data interval and adjusting an optimization algorithm.

In addition, the server/cloud 130 may receive a control signal from the device 120 and transmit the control signal to another device that performs an operation according to the control signal.

In addition, the device 120 for providing a gesture recognition service may include various types of devices equipped with a radar sensor. For example, the device 120 may be a smartphone, television, computer, automobile, door phone, or game controller that provides gesture recognition-based UX/UI. In addition, the device 120 may be configured to be connected to a smartphone via a connector such as USB.

Figure 2:
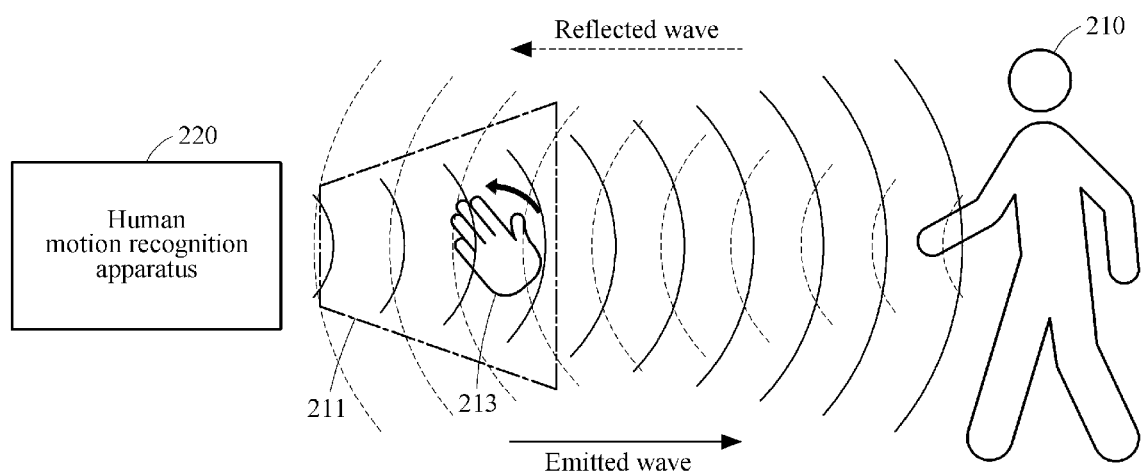
FIG. 2 is an exemplary view for explaining a basic operation principle of a motion recognition apparatus according to one embodiment of the present disclosure.

FIG. 2 is an exemplary view for explaining a basic operation principle of a motion recognition apparatus according to one embodiment of the present disclosure.

Referring to FIG. 2, a human motion recognition apparatus 220 according to an embodiment emits a radar signal, and a reflected signal is generated as a result of interaction between the emitted radar signal and an object 210.

In this case, the emitted radar signal may be expressed as an 'emitted wave', an 'emitted radar signal', or a 'transmitted radar signal'. In this specification, for convenience of description, the emitted radar signal will be expressed as an 'emitted radar signal'.

In this case, the reflected signal may be expressed as a 'reflected wave' or a 'reflected signal'. In this specification, for convenience of description, the reflected signal will be expressed as a 'reflected signal'.

The object 210 may be a human body or a thing. However, in one embodiment, the object 210 is assumed to be a user or person who is the subject of gesture or motion recognition.

The human motion recognition apparatus 220 may perform situation detection and gesture recognition by adjusting parameters for a plurality of radars or one radar.

For example, the human motion recognition apparatus 220 may emit a first radar signal for detecting approach or existence of the object 210 and detect the position of the object 210 by processing a reflected signal of the first radar signal.

The first radar signal for detecting the position of the object 210 may use a preset frequency band. Here, the human motion recognition apparatus 220 may set parameters such as a modulation period suitable for detecting point information about the position of the object 210, transmission power, and a sampling rate for signal processing.

The human motion recognition apparatus 220 may determine whether the object 210 has reached the preset gesture recognition area 211.

When the human motion recognition apparatus 220 determines that the object 210 is in the preset gesture recognition area 211, the human motion recognition apparatus 220 may emit a second radar signal for gesture recognition.

The human motion recognition apparatus 220 may adjust the radar parameters to recognize a hand gesture 213 of the object 210.

The second radar signal may be in the same frequency band as the first radar signal, and may be set to have a shorter modulation period, faster detection speed, and higher resolution that the first radar signal. In addition, compared to signal processing of the reflected signal of the first radar signal, signal processing of the reflected signal of the second radar signal may be performed at a faster sampling rate, and may be performed through a more complicated process.

Here, 'signal processing' refers to a process of applying various algorithms to obtain desired information from a received signal.

Information on distance, speed, and angle may be obtained through a result of signal processing for detecting the position of an object.

For example, the received signal may be subjected to range-processing to perform a window function and fast Fourier transform, Doppler processing, echo signal suppression processing, beam scan or digital beamforming, and the like.

The human motion recognition apparatus 220 may be provided with one radar or a plurality of radars.

The human motion recognition apparatus 220 may be provided with any one of a pulse radar that performs emission during a short pulse width interval and performs reception before emission of the next pulse and a radar that emits a continuous wave having a frequency linearly modulated over time.

The human motion recognition apparatus 220 may perform gesture recognition by comparing the pattern and the characteristic information of a signal-processed reflected signal with pre-learned and stored data.

The human motion recognition apparatus 220 may be embedded in a smartphone, a game controller, a door phone, a television, or a personal computer or may be connected to a smart device via a connector. In addition, the human motion recognition apparatus 220 may be connected to a device, such as a smartphone, a game controller, a door phone, a television, or a personal computer, via a network.

Figure 3:
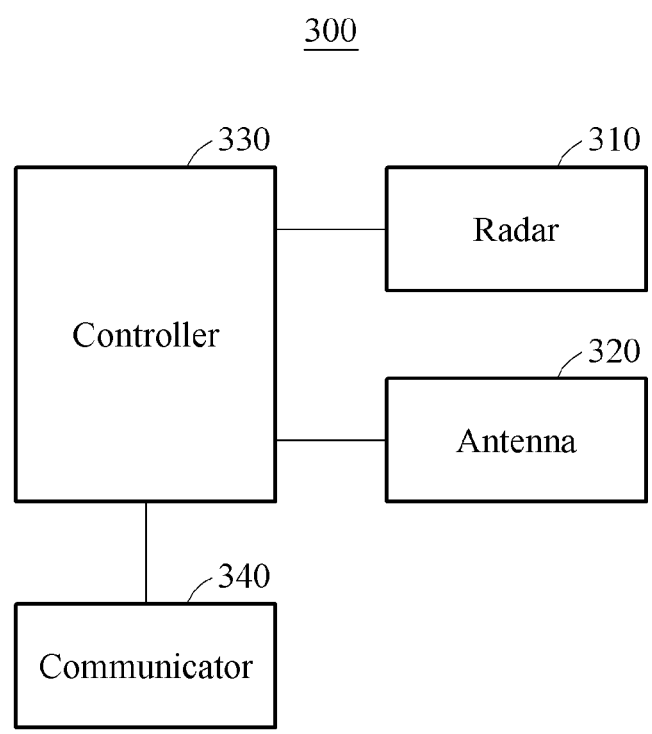
FIG. 3 is a diagram for explaining the configuration of a radar-based human motion recognition apparatus according to one embodiment of the present disclosure.

FIG. 3 is a diagram for explaining the configuration of a radar-based human motion recognition apparatus according to one embodiment of the present disclosure.

Referring to FIG. 3, a human motion recognition apparatus 300 may include a radar 310, an antenna 320, and a controller 330. The human motion recognition apparatus 300 may further include a communicator 340.

The radar 310 emits a radar signal.

The antenna 320 receives a signal reflected from an object with respect to the emitted radar signal. In this case, the antenna 320 may be composed of a monopulse antenna, a phased array antenna, or an array antenna having a multi-channel receiver structure.

The controller 330 may include at least one processor. In this case, the controller 330 may be connected to instructions or one or more computer-readable storage media recorded in a program.

Accordingly, the controller 330 may include at least one processor configured to set parameters for the radar 310 so that a first radar signal for detecting the position of an object is emitted in a first time interval, to detect the position of the object based on first signal processing for a reflected signal of the first radar signal, and to determine whether the position of the object is within a preset gesture recognition area.

In addition, when the position of the object is within a gesture recognition area, the controller 330 may be configured to adjust parameters for the radar 310 so that a second radar signal for gesture recognition is emitted in a second time interval, to determine situation information based on second signal processing for a reflected signal of the second radar signal, and to transmit the situation information to an application or a driving system.

In this case, the situation information may be determined by a running application. For example, when a running application provides a user interface through gesture recognition, the situation information may be gesture recognition. In addition, when there is an activated sensor module, the situation information may be control information for the sensor module. In this case, the control information may be generated by gesture recognition, and may be a control signal corresponding to a recognized gesture.

The communicator 340 may transmit data to an external server or a device or receive data therefrom through a wired or wireless network.

Figure 4:
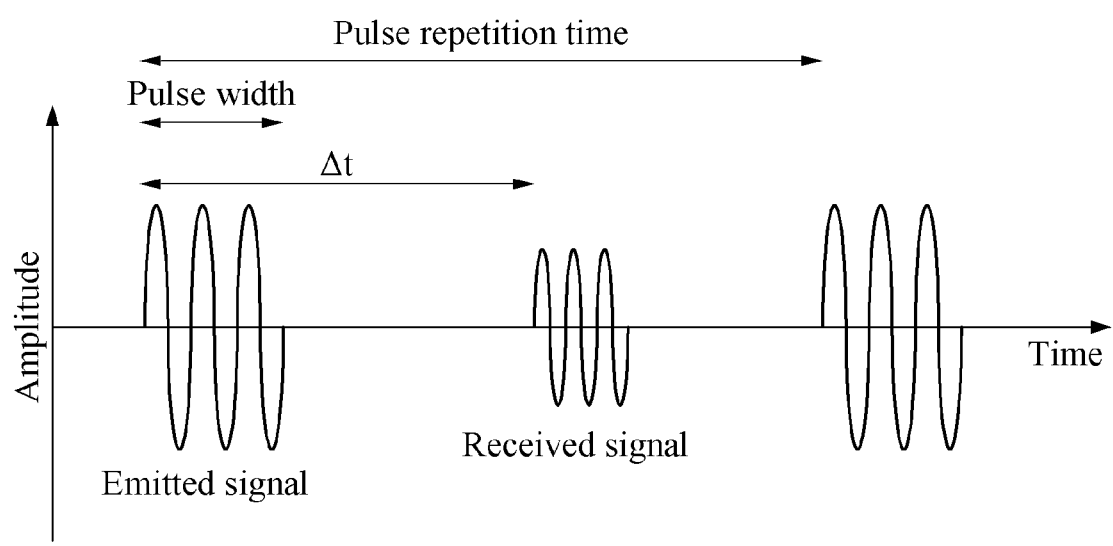
FIG. 4 is a diagram for explaining a transmission and reception concept in a pulse radar according to one embodiment of the present disclosure.

FIG. 4 is a diagram for explaining a transmission and reception concept in a pulse radar according to one embodiment of the present disclosure.

The pulse radar performs emission during a short pulse width interval and reception before emission of the next pulse, and may be used when high range resolution is required.

The relationship between a pulse width T and a range resolution is expressed by Equation 1.

$$\Delta r = c\tau/2 \qquad \text{[Equation 1]}$$

wherein c represents the speed of light.

Referring to Equation 1, to achieve a range resolution of 10 cm, a pulse width of about 0.67 ns and a frequency band of 1.5 GHz or more are required.

To improve resolving power and a detectable range, pulse compression methods using modulated pulse waveforms, such as linear frequency modulation (LFM) and pulse-code modulation (PCM), may be applied.

Figure 5:
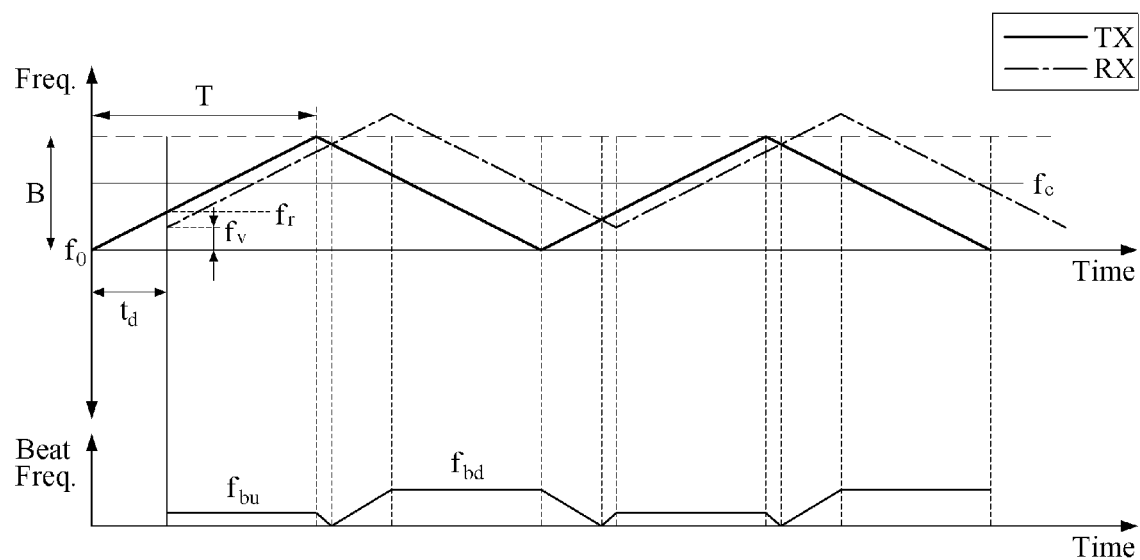
FIG. 5 is a diagram for explaining an FMCW radar concept according to one embodiment of the present disclosure.

FIG. 5 is a diagram for explaining an FMCW radar concept according to one embodiment of the present disclosure.

An FMCW radar emits a continuous wave having a frequency linearly modulated over time.

In FIG. 5, B represents a modulation frequency bandwidth, fc represents a center frequency, T represents a period, and Beat Freq. represents the frequency of a beat signal.

The beat signal is a result obtained by multiplying a received signal (RX) reflected from an object by a transmitted signal, discharging the sum component of frequencies, and obtaining the difference component thereof.

When the frequency fb of a beat signal is $|f_{TX}-f_{RX}|$, a beat frequency by up-chirp (an interval in which a frequency increases linearly) is $f_{bu}$, and a beat frequency by down-chirp (an interval in which a frequency decreases linearly) is $f_{bd}$, the distance R to a target and the relative speed v of the target may defined as in Equations 2 and 3.

$$R = \frac{(f_{bu} + f_{bd}) \cdot cT}{4B} \quad \text{[Equation 2]}$$

$$v = \frac{(f_{bu} - f_{bd}) \cdot c}{2f_c} \quad \text{[Equation 3]}$$

Figure 6:
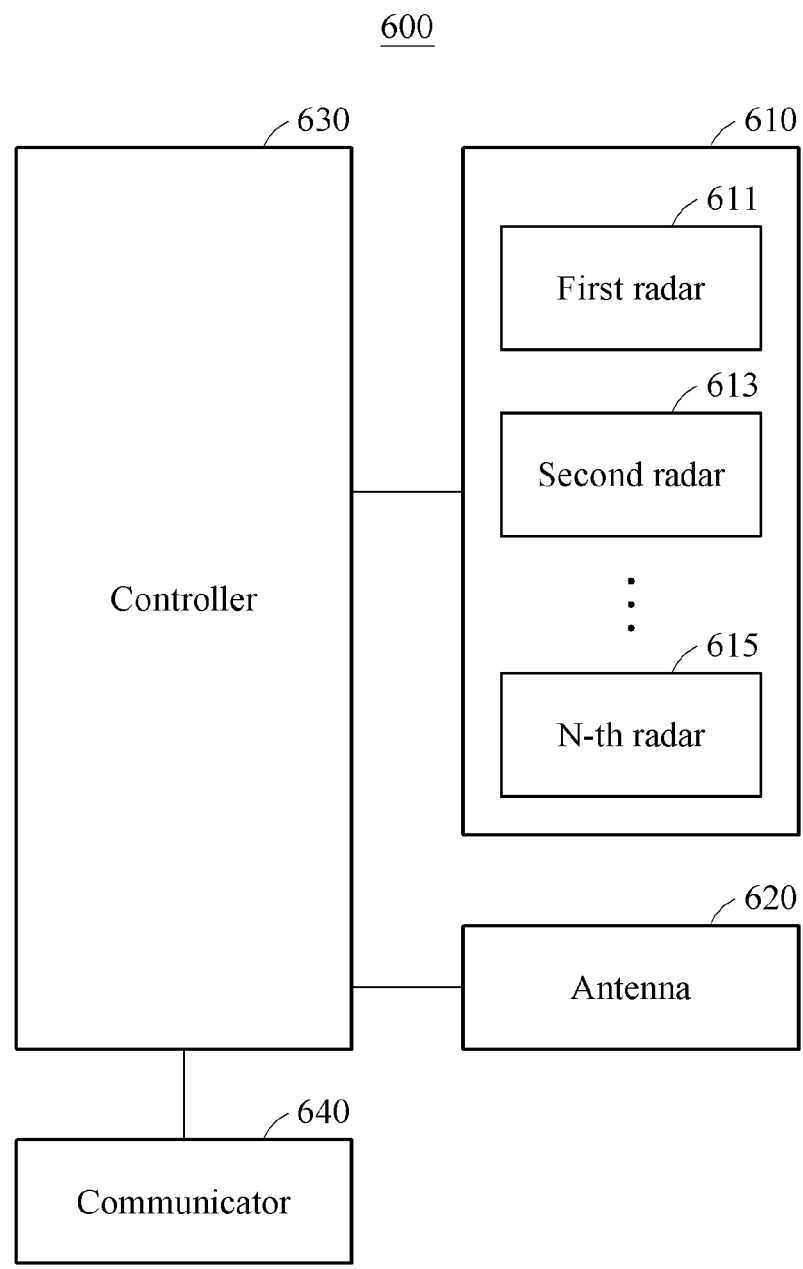
FIG. 6 is a diagram for explaining the configuration of a radar-based human motion recognition apparatus according to another embodiment of the present disclosure.

FIG. 6 is a diagram for explaining the configuration of a radar-based human motion recognition apparatus according to another embodiment of the present disclosure.

Referring to FIG. 6, a human motion recognition apparatus 600 includes a radar 610, an antenna 620, and a controller 630. The human motion recognition apparatus 600 may further include a communicator 640.

The radar 610 includes a plurality of radars 611, 613, and 615.

The radars 611, 613, and 615 may operate in the same frequency band or in different frequency bands.

The first radar 611 emits a first radar signal for detecting a position of an object or a first situation.

The second radar 613 emits a second radar signal for detecting gesture recognition or a second situation.

In this case, the first situation indicates that existence of an object, approach of a user, movement of an object, or movement of a user has occurred. The second situation may be a situation recognized according to applications or operation modes being executed, such as gesture recognition and control of connected sensors.

The first radar signal may be a pulse radar signal using a pulse signal, and the second radar signal may be a continuous wave radar signal continuously output with respect to time.

The antenna 620 receives a first reflected signal reflected from an object by the first radar signal and a second reflected signal reflected from the object by the second radar signal.

The antenna 620 may be configured as a monopulse antenna, a phased array antenna, or an array antenna having a multichannel receiver structure.

Figure 7:
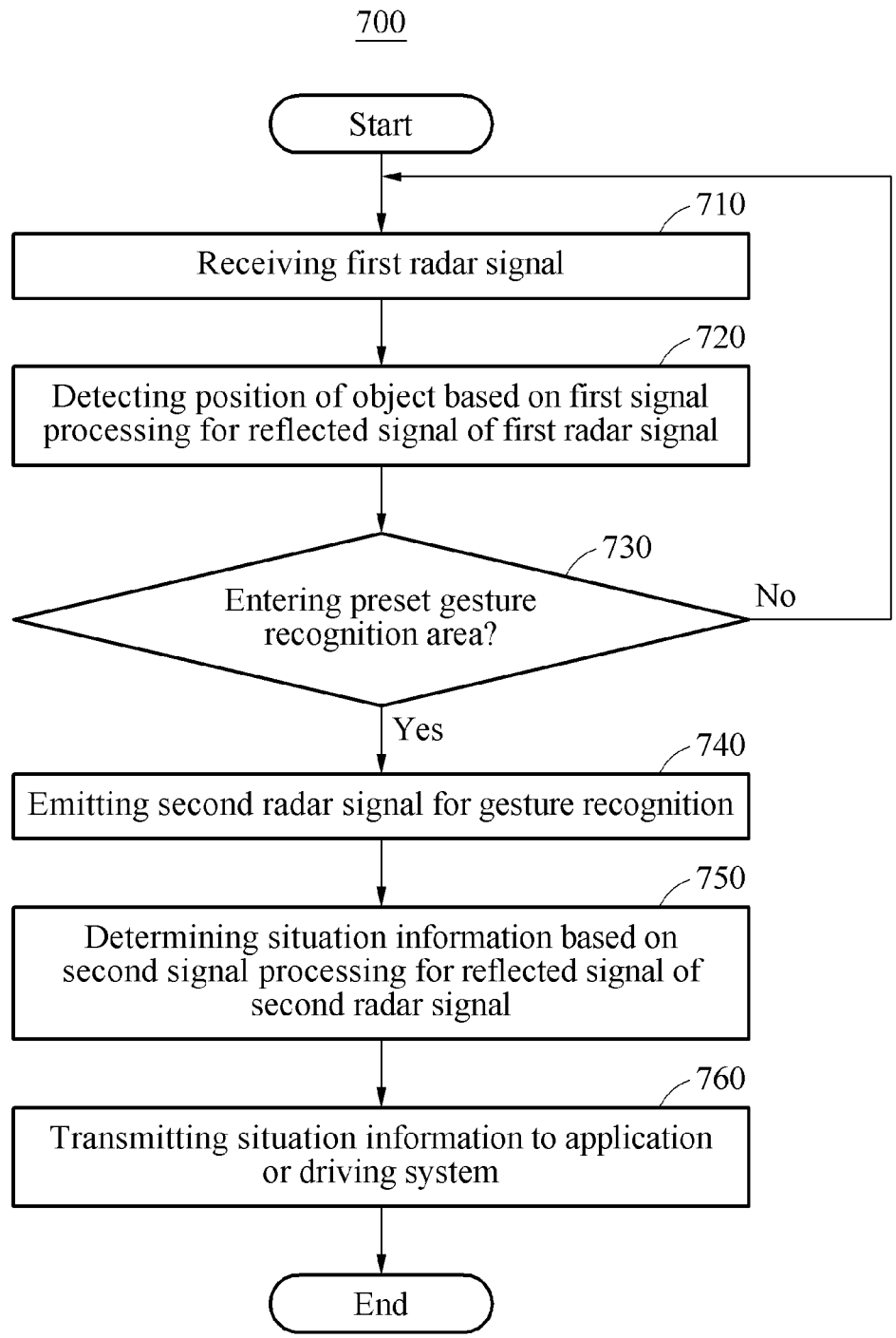
FIG. 7 is a flowchart for explaining a radar-based human motion recognition method according to one embodiment of the present disclosure.
Figure 8:
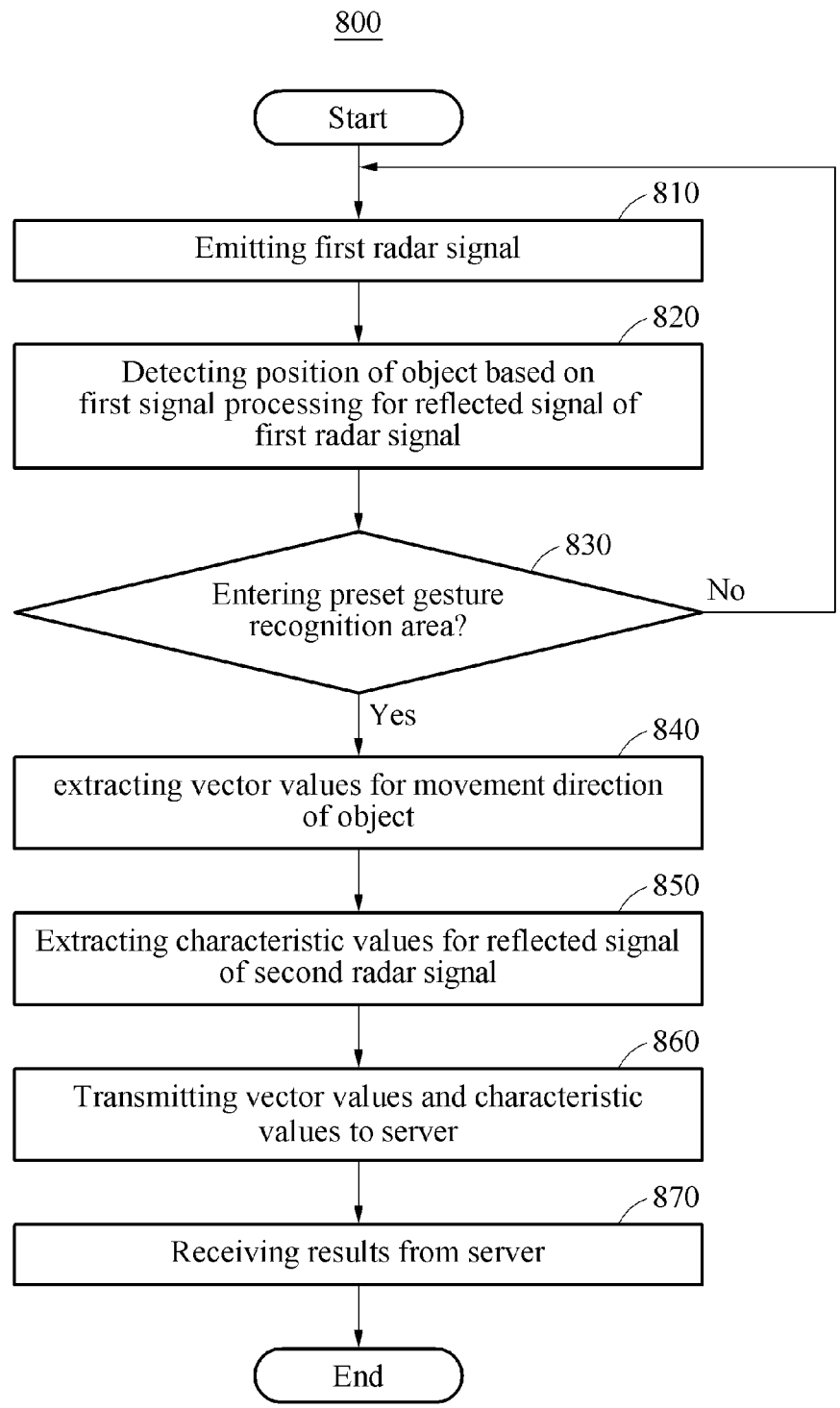
FIG. 8 is a flowchart for explaining a radar-based human motion recognition method according to another embodiment of the present disclosure.

The controller 630 may include at least one processor configured to perform the method shown in FIG. 7 or 8.

Accordingly, the controller 630 may be configured to detect a position of the object based on first signal processing for the first reflected signal; determine whether the position of the object is within a preset gesture recognition area; activate a second radar for emitting a second radar signal for gesture recognition when the position of the object is within the gesture recognition area; generate a multi-radar emission frame for emitting the first and second radar signals in a time sharing manner; extract vector values for the movement direction of the object based on first signal processing for a reflected signal of a first radar signal received in the Nth (N being an integer greater than 0) period of the multi-radar emission frame and a reflected signal of a first radar signal received in the (N+k)th (k being an integer greater than 0) period of the multi-radar emission frame; perform second signal processing for a reflected signal of a second radar signal received from the Nth period to the (N+k)th period of the multi-radar emission frame; and extract characteristic values for the reflected signal of the second radar signal based on the second signal processing.

In addition, the controller 630 may be configured to detect a position of the object based on first signal processing for the first reflected signal; determine whether the position of the object is within a preset gesture recognition area; determine a current operation mode when the position of the object is within the gesture recognition area; receive a second radar signal for gesture recognition when the current operation mode is a gesture recognition mode; determine situation information based on second signal processing for the second reflected signal; and transmit the situation information to an application or a driving system.

When a position of the object is within a gesture recognition area, the controller 630 may control the first and second radars 611 and 613 to output a multi-radar emission frame for emitting the first and second radar signals in a time sharing or time-division multiplexing manner.

The communicator 640 may include a circuit that performs short-range wired/wireless communication and long-range wired/wireless communication.

The communicator 640 transmits the vector values and the characteristic values to a server, and receives at least one of gesture information determined based on the vector values and the characteristic values, control information corresponding to the gesture information, and information on an external device associated with the gesture information from the server.

FIG. 7 is a flowchart for explaining a radar-based human motion recognition method according to one embodiment of the present disclosure.

The method shown in FIG. 7 may be performed using the apparatus shown in FIG. 3 or 6.

In Step 710, the apparatus emits a first radar signal for detecting a position of an object.

In Step 720, the apparatus receives a reflected signal of the first radar signal generated by the object and detects a position of the object based on first signal processing for the received reflected signal of the first radar signal.

In Step 730, the apparatus determines whether the object has entered a preset gesture recognition area or whether the position of the object is within the preset gesture recognition area.

When the object does not exist in the preset gesture recognition area, the apparatus may perform the method again from Step 710.

In Step 740, when the position of the object is within the gesture recognition area, the apparatus determines a current operation mode, and emits a second radar signal for gesture recognition when the current operation mode is a gesture recognition mode.

In this case, when a running application supports gesture recognition, the current operation mode may be determined as a gesture recognition mode.

In Step 750, the apparatus receives a reflected signal of the second radar signal generated by the object, and determines situation information based on second signal processing for the reflected signal of the second radar signal.

In this case, the situation information may be recognized gesture information corresponding to an action or movement of the object. In addition, the situation information may be a control signal for operating an application in response to a recognized gesture. For example, when a user moves the hand from left to right and the recognized gesture is a gesture that moves the hand from left to right, 'moving the hand from left to right' is recognized as gesture information, and 'moving a screen being displayed left or right' according to the gesture of the user is control information.

In Step 760, the apparatus transmits the situation information to an application or a driving system. In this case, the driving system may be a sensor, display, or lighting device of the apparatus. In addition, the driving system may be an external server. In this case, the situation information may be transmitted to the external server through a communicator.

In Step 740, to emit a second radar signal, the apparatus may receive a multi-radar emission frame for emitting the first and second radar signals in a time sharing manner.

In addition, in Step 750, the apparatus may recognize gestures by comparing pre-learned and stored data with signal-processed data.

In addition, in Step 750, the apparatus may perform Steps 840 and 850 shown in FIG. 8, and may recognize a gesture of an object using vector values and characteristic values.

For example, when vector values and characteristic values for a specific gesture are stored by user's repeated input, the apparatus may recognize the gesture by comparing the vector and characteristic values with stored data.

When there is no vector value and characteristic value that match stored data, the apparatus may announce failure of gesture recognition or report the same to a server.

FIG. 8 is a flowchart for explaining a radar-based human motion recognition method according to another embodiment of the present disclosure.

The method shown in FIG. 8 may be performed using the apparatus shown in FIG. 3 or 6.

In Step 810, the apparatus emits a first radar signal for detecting a position of an object.

In Step 820, the apparatus receives a reflected signal of the first radar signal generated by the object and detects a position of the object based on first signal processing for the received reflected signal of the first radar signal.

In Step 830, the apparatus determines whether the object has entered a preset gesture recognition area or whether the position of the object is within the preset gesture recognition area.

When the object does not exist in the preset gesture recognition area, the apparatus may perform the method again from Step 810.

In Step 840, when the position of the object is within the gesture recognition area, the apparatus activates a second radar for emitting a second radar signal for gesture recognition, and transmits a multi-radar emission frame for emitting the first and second radar signals in a time sharing manner.

In Step 840, the apparatus extracts vector values for a movement direction of the object based on first signal processing for a reflected signal of a first radar signal received after the multi-radar emission frame is transmitted, performs second signal processing for a reflected signal of the second radar signal, and extracts characteristic values for the reflected signal of the second radar signal based on the second signal processing.

In addition, in Step 840, the apparatus extracts vector values for a movement direction of the object based on first signal processing for a reflected signal of a first radar signal received in the Nth (N being an integer greater than 0) period of the multi-radar emission frame and a reflected signal of a first radar signal received in the (N+k)th (k being an integer greater than 0) period of the multi-radar emission frame.

Accordingly, the apparatus may determine a location at which a gesture starts and a location at which the gesture proceeds by comparing a position measured in the Nth period and a position measured in the (N+k)th period.

In Step 850, the apparatus performs second signal processing for a reflected signal of a second radar signal received from the Nth period to the (N+k)th period of the multi-radar emission frame, and extracts characteristic values for the reflected signal of the second radar signal based on the second signal processing.

In this case, the characteristic values may include pattern information of minute Doppler signals or pattern information of result values obtained by performing digital signal processing on the second reflected signal at least once.

In Step 860, the apparatus transmits the vector values and the characteristic values to a server.

The reason for transmitting the vector values and the characteristic value to a server is to allow the server to recognize the gesture. That is, when the apparatus performs signal processing and results of signal processing are transmitted to a server, the server compares the received data with learned data to perform gesture recognition.

In this case, the apparatus may confirm current position information and transmit the current position information, the vector values, and the characteristic values to a server. When control information corresponding to a recognized gesture differs according to current position information, the server may generate control information in consideration of the current position information of the apparatus and transmit the control information to the apparatus.

In Step 870, the apparatus receives results from the server.

More specifically, the apparatus receives at least one of gesture information determined based on the vector values and the characteristic values, control information corresponding to the gesture information, and information on an external device associated with the gesture information from the server.

In this case, the gesture information determined based on the vector values and the characteristic values may be information about 'holding and spreading hands', 'shaking hands', or 'moving fingers'.

In this case, the control information corresponding to the gesture information may be information to control operation of an application such as 'actuating a specific sensor', 'performing pop-up of a specific screen', or 'data transmission'.

In this case, the information on an external device associated with the gesture information may be information that a device other than the apparatus was operated by recognized gesture or notification that information was transmitted to another device by recognized gesture.

In the embodiment shown in FIG. 8, when the reflected signal of the first radar signal is processed, different algorithms may be applied depending on performance stages.

For example, in the step of determining whether the position of an object is within a preset gesture recognition area, the first signal processing for the received first reflected signal may include range-processing to extract distance information through a window function and fast Fourier transform, echo suppression processing to suppress a signal magnitude of clutter having a relatively high reflectance, and Doppler processing to extract point information for position detection.

The echo suppression processing is a process of suppressing a reflected signal by the body, which is the largest clutter in the human body. By performing the echo suppression processing before the Doppler processing, a case in which a person is simply approaching and a case of stretching arms for gesture input may be distinguished from each other.

In addition, in the first signal processing performed in the step of extracting vector values, the echo suppression processing may not be performed, and the Doppler processing may be performed. Since influence may be reduced due to the body in a gesture recognition area and gesture recognition is performed through the second signal processing, the first signal processing performed in the step of extracting vector values may be performed without the echo suppression processing.

Since the second signal processing is performed to compare signal-processed results with pre-stored data, several procedures may be omitted or a larger number of procedures may be applied compared to the first signal processing.

For example, the second signal processing may include digital beamforming processing for three-dimensional spectrum generation, and the digital beamforming processing may be performed after Doppler processing.

The kinds of characteristic values of the second signal processing may vary depending on the types of processing applied. When processing such as digital beamforming is applied, operation of comparing with pre-learned data may be reduced. When digital beamforming is not performed, operation of comparing with pre-learned data may be increased.

Accordingly, the type of processing applied to the second signal processing may be adaptively determined depending on time allowed for gesture recognition, the performance of a server, and the level of learned data.

Although not shown in FIG. 8, the method may further include a step of determining local gesture information based on the vector values and the characteristic values and comparing the local gesture information with the gesture information received from the server and a step of transmitting the local gesture information to an application or a driving system when the local gesture information matches the gesture information received from the server.

In this case, the local gesture information may be determined when learned data is stored in the apparatus.

When the local gesture information does not match the gesture information received from the server, the apparatus may change the structure of the multi-radar emission frame or adjust the parameters of the radar.

Figure 9:
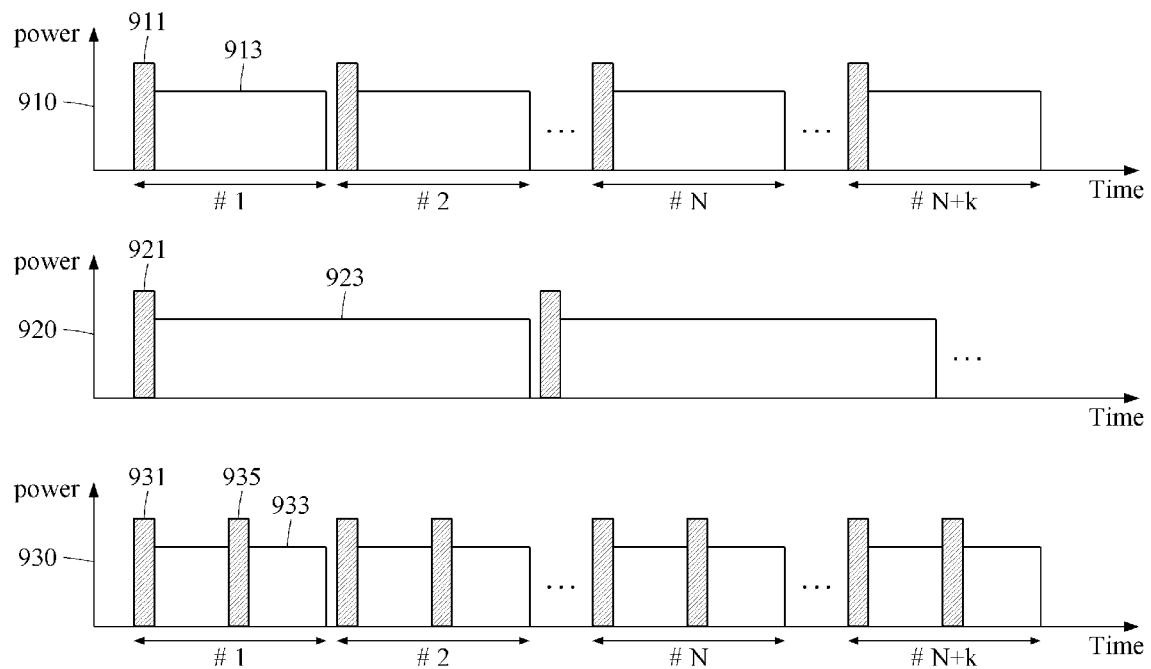
FIG. 9 includes diagrams for explaining a multi-radar emission frame according to one embodiment of the present disclosure.

FIG. 9 includes diagrams for explaining a multi-radar emission frame according to one embodiment of the present disclosure.

Referring to FIG. 9, Reference Number 910 represents a basic structure of the multi-radar emission frame.

N represents the period index of the multi-radar emission frame, and '# N+k' represents the (N+k)th period.

Referring to a basic structure 910 of the multi-radar emission frame, each period includes a first radar emission interval 911 in which a first radar signal is emitted and a second radar emission interval 913 in which a second radar signal is emitted.

Reference Number 920 denotes a multi-radar emission frame when measurement of a motion vector is unnecessary.

Depending on applications, it may be unnecessary to determine the direction of movement of a gesture.

For example, in the case of performing a gesture of turning a finger in a gesture recognition area, a gesture of turning a finger clockwise and a gesture of turning a finger counterclockwise may both be recognized as the same motion. Accordingly, when vector values for a movement direction do not need to be measured, a first radar emission interval 921 may be set equal to the first radar emission interval 911, and a second radar emission interval 923 may be set to be much longer than the second radar emission interval 913.

Reference Number 930 denotes a multi-radar emission frame structure when vector values for a movement direction need to be precisely measured.

For example, in FIG. 8, when local gesture information does not match gesture information received from a server, the apparatus may perform time-shared control of the multi-radar emission frame of Reference Number 910 to the structure of Reference Number 930.

Referring to Reference Number 930, one emission frame may be composed of two or more first radar emission intervals 931 and 935 and a second radar emission interval 933.

A method of recognizing surrounding situations and various human motions using a multi-radar-based device and an apparatus therefor can be provided.

A method of recognizing movement directions and gestures using reflected waves generated by interaction between user's motions and radar signals and an apparatus therefor can be provided.

Various human motions can be recognized by configuring a multi-radar emission frame through adjusting parameters of a plurality of radars or a single radar and providing a multi-radar field through the multi-radar emission frame.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A radar-based human motion recognition method, comprising:
    emitting a first radar signal for detecting a position of a user;
    receiving a reflected signal of the first radar signal generated by the user;
    detecting a position of the user based on first signal processing for the received reflected signal of the first radar signal and determining whether the position of the user is within a preset gesture recognition area;
    activating a second radar for emitting a second radar signal for gesture recognition when the position of the user is within the gesture recognition area and transmitting a multi-radar emission frame for emitting the first and second radar signals in a time sharing manner to recognize a movement direction of the user's hand gesture and gesture type;
    extracting vector values for the movement direction of the user's hand gesture based on first signal processing for a reflected signal of a first radar signal received after the multi-radar emission frame is transmitted, performing second signal processing for a reflected signal of the second radar signal, and extracting characteristic values for the reflected signal of the second radar signal based on the second signal processing;
    transmitting the vector values and the characteristic values to a server; and
    receiving at least one of gesture information determined based on the vector values and the characteristic values, control information corresponding to the gesture information, and information on an external device associated with the gesture information from the server.

2. The radar-based human motion recognition method according to claim 1, wherein the extracting of the characteristic values comprises extracting vector values for a movement direction of the user's hand gesture based on first signal processing for a reflected signal of a first radar signal received in an Nth (N being an integer greater than 0) period of the multi-radar emission frame and a reflected signal of a first radar signal received in an (N+k)th (k being an integer greater than 0) period of the multi-radar emission frame; and
    performing second signal processing for a reflected signal of a second radar signal received from an Nth period to an (N+k)th period of the multi-radar emission frame, and extracting characteristic values for the reflected signal of the second radar signal based on the second signal processing.

3. The radar-based human motion recognition method according to claim 2, wherein, in the determining of whether the position of the user is within the preset gesture recognition area, the first signal processing for the received first reflected signal comprises range-processing to extract distance information through a window function and fast Fourier transform, echo suppression processing to suppress a signal magnitude of clutter having a relatively high reflectance, and Doppler processing to extract point information for position detection;
    in the first signal processing performed in the extracting of the vector values, the echo suppression processing is not performed and the Doppler processing is performed; and
    the second signal processing comprises digital beamforming processing for three-dimensional spectrum generation.

4. The radar-based human motion recognition method according to claim 2, wherein the characteristic values comprise pattern information of minute Doppler signals or pattern information of result values obtained by performing digital signal processing on the second reflected signal at least once.

5. The radar-based human motion recognition method according to claim 2, further comprising:
    determining local gesture information based on the vector values and the characteristic values and comparing the local gesture information with the gesture information received from the server; and
    transmitting the local gesture information to an application or a driving system when the local gesture information matches the gesture information received from the server.

6. The radar-based human motion recognition method according to claim 2, wherein, in the transmitting of the vector values and the characteristic values, current position information is confirmed and the current position information, the vector values, and the characteristic values are transmitted to the server.

7. A radar-based human motion recognition method, comprising:
    emitting a first radar signal for detecting a position of a user;
    receiving a reflected signal of the first radar signal generated by the user;
    detecting a position of the user based on first signal processing for the received reflected signal of the first radar signal and determining whether the position of the user is within a preset gesture recognition area;

determining a current operation mode when the position of the user is within the gesture recognition area;

activating a second radar for emitting a second radar signal for gesture recognition and transmitting a multi-radar emission frame for emitting the first and second radar signals in a time sharing manner to recognize a movement direction of the user's hand gesture and gesture type when the current operation mode is a gesture recognition mode;

receiving a reflected signal of the first radar signal received after the multi-radar emission frame is transmitted, receiving a reflected signal of the second radar signal generated by the user;

determining gesture recognition information of the user based on first signal processing for the reflected signal of the first radar signal and second signal processing for the reflected signal of the second radar signal; and transmitting the gesture recognition information of the user to an application or a driving system.

8. The radar-based human motion recognition method according to claim 7, wherein the first radar signal is a pulse radar signal using a pulse signal, and the second radar signal is a continuous wave radar signal continuously output with respect to time.

9. The radar-based human motion recognition method according to claim 7, wherein the situation information is gesture recognition information of the user, and the determining of the situation information comprises extracting vector values for a movement direction of the user based on first signal processing for a reflected signal of a first radar signal received in an Nth (N being an integer greater than 0) period of the multi-radar emission frame and a reflected signal of a first radar signal received in an (N+k)th (k being an integer greater than 0) period of the multi-radar emission frame;

performing second signal processing for a reflected signal of a second radar signal received from an Nth period to an (N+k)th period of the multi-radar emission frame, and extracting characteristic values for the reflected signal of the second radar signal based on the second signal processing; and recognizing a gesture of the user using the vector values and the characteristic values.

10. A radar-based human motion recognition apparatus, comprising:

a first radar for emitting a first radar signal for detecting a position of a user;

a second radar for emitting a second radar signal for gesture recognition;

an antenna for receiving a first reflected signal reflected from the user by the first radar signal and a second reflected signal reflected from the user by the second radar signal;

a controller comprising at least one processor configured to detect a position of the user based on first signal processing for the first reflected signal, determine whether the position of the user is within a preset gesture recognition area, activate a second radar for emitting a second radar signal for gesture recognition when the position of the user is within the gesture recognition area, generate a multi-radar emission frame for emitting the first and second radar signals in a time sharing manner to recognize a movement direction of the user's hand gesture and gesture type, extract vector values for a movement direction of the user's hand gesture based on first signal processing for a reflected signal of a first radar signal received after the multi-radar emission frame is transmitted, perform second signal processing for a reflected signal of the second radar signal, and extract characteristic values for the reflected signal of the second radar signal based on the second signal processing; and a communicator for transmitting the vector values and the characteristic values to a server and receiving at least one of gesture information determined based on the vector values and the characteristic values, control information corresponding to the gesture information, and information on an external device associated with the gesture information from the server.

11. The radar-based human motion recognition apparatus according to claim 10, wherein the controller extracts vector values for a movement direction of the user's hand gesture based on first signal processing for a reflected signal of a first radar signal received in an Nth (N being an integer greater than 0) period of the multi-radar emission frame and a reflected signal of a first radar signal received in an (N+k)th (k being an integer greater than 0) period of the multi-radar emission frame; performs second signal processing for a reflected signal of a second radar signal received from an Nth period to an (N+k)th period of the multi-radar emission frame; and extracts characteristic values for the reflected signal of the second radar signal based on the second signal processing.

12. The radar-based human motion recognition apparatus according to claim 10, wherein the characteristic values comprise pattern information of minute Doppler signals or pattern information of result values obtained by performing digital signal processing on the second reflected signal at least once.

13. A radar-based human motion recognition apparatus, comprising:

a first radar for emitting a first radar signal for detecting a position of a user;

a second radar for emitting a second radar signal for gesture recognition;

an antenna for receiving a first reflected signal reflected from the user by the first radar signal and a second reflected signal reflected from the user by the second radar signal; and a controller comprising at least one processor configured to detect a position of the user based on first signal processing for the first reflected signal, determine whether the position of the user is within a preset gesture recognition area, determine a current operation mode when the position of the user is within the gesture recognition area, activate a second radar for emitting a second radar signal for gesture recognition when the current operation mode is a gesture recognition mode, transmit a multi-radar emission frame for emitting the first and second radar signals in a time sharing manner to recognize a movement direction of the user's hand gesture and gesture type, determine gesture recognition information of the user based on first signal processing for the reflected signal of the first radar signal and second signal processing for the second reflected signal, and transmit the gesture recognition information of the user to an application or a driving system.

14. The radar-based human motion recognition apparatus according to claim 13, wherein the first radar signal is a pulse radar signal using a pulse signal, and the second radar signal is a continuous wave radar signal continuously output with respect to time.

15. A radar-based human motion recognition apparatus, comprising:
- a radar for emitting radar signals;
- an antenna for receiving reflected signals reflected from a user; and
- a controller comprising at least one processor configured to set parameters for the radar so that the radar emits a first radar signal for detecting a position of the user in a first time interval, detect a position of the user based on first signal processing for a reflected signal of the first radar signal, determine whether the position of the user is within a preset gesture recognition area, adjust parameters for the radar so that the radar emits a second radar signal for gesture recognition in a second time interval when the position of the user is within the gesture recognition area, transmit a multi-radar emission frame for emitting the first and second radar signals in a time sharing manner to recognize a movement direction of the user's hand gesture and gesture type, determine gesture recognition information of the user based on first signal processing for a reflected signal of the first radar signal and second signal processing for a reflected signal of the second radar signal, and transmit the gesture recognition information of the user to an application or a driving system.

* * * * *